United States Patent
Yurimoto et al.

(10) Patent No.: US 12,505,567 B2
(45) Date of Patent: Dec. 23, 2025

(54) EXCREMENT PROPERTY ESTIMATION MODEL LEARNING DEVICE, EXCREMENT PROPERTY ESTIMATION DEVICE, EXCREMENT PROPERTY ESTIMATION MODEL LEARNING METHOD, EXCREMENT PROPERTY ESTIMATION METHOD, AND PROGRAM

(71) Applicant: Central Institute for Experimental Medicine and Life Science, Kanagawa (JP)

(72) Inventors: Terumi Yurimoto, Kanagawa (JP); Erika Sasaki, Kanagawa (JP); Takashi Inoue, Kanagawa (JP)

(73) Assignee: Central Institute for Experimental Medicine and Life Science, Kanagawa (JP)

( * ) Notice: Subject to any disclaimer, the term of this patent is extended or adjusted under 35 U.S.C. 154(b) by 339 days.

(21) Appl. No.: 18/550,210

(22) PCT Filed: Mar. 4, 2022

(86) PCT No.: PCT/JP2022/009497
§ 371 (c)(1),
(2) Date: Sep. 12, 2023

(87) PCT Pub. No.: WO2022/196400
PCT Pub. Date: Sep. 22, 2022

(65) Prior Publication Data
US 2024/0249424 A1    Jul. 25, 2024

(30) Foreign Application Priority Data
Mar. 19, 2021 (JP) .................. 2021-045324

(51) Int. Cl.
*G06T 7/90* (2017.01)
*A01K 29/00* (2006.01)
*G06T 7/564* (2017.01)

(52) U.S. Cl.
CPC ............ *G06T 7/564* (2017.01); *A01K 29/005* (2013.01); *G06T 7/90* (2017.01);
(Continued)

(58) Field of Classification Search
CPC . G06T 7/564; G06T 7/90; G06T 2207/10024; G06T 2207/10048;
(Continued)

(56) References Cited

U.S. PATENT DOCUMENTS

2007/0292011 A1* 12/2007 Nishimura ........... A61B 5/7264
382/128
2013/0276709 A1* 10/2013 Ryder .................. A01K 5/0258
119/51.01
(Continued)

FOREIGN PATENT DOCUMENTS

CA    3121334 A1    6/2020
CN    111709333 A    9/2020
(Continued)

OTHER PUBLICATIONS

European Patent Office, European Office Action for corresponding European application No. 22771154.6 dated Feb. 19, 2025.
(Continued)

*Primary Examiner* — Ali Bayat
(74) *Attorney, Agent, or Firm* — McDonnell Boehnen Hulbert & Berghoff LLP

(57) ABSTRACT

An excrement property estimation model learning device includes a training data acquisition unit configured to acquire training data including input-side training data including an excrement space which is a predetermined
(Continued)

space where there is excrement from an animal being reared, and learning image data that is image data of a captured image obtained by capturing the excrement space, and a correct label indicating whether any abnormal excrement that is abnormal excrement is reflected in an image shown in the learning image data, an excrement property estimation learning model execution unit configured to use an excrement property estimation learning model, which is a machine learning model for estimating a probability that abnormal excrement is reflected in the learning image data, to estimate the probability that abnormal excrement is reflected in the image shown in the learning image data, and an update unit configured to update, on the basis of a difference between an estimation result from the excrement property estimation learning model execution unit and the correct label, the excrement property estimation learning model such that the difference is reduced.

8 Claims, 15 Drawing Sheets

(52) U.S. Cl.
CPC .............. *G06T 2207/10024* (2013.01); *G06T 2207/10048* (2013.01); *G06T 2207/20081* (2013.01); *G06T 2207/20084* (2013.01)

(58) Field of Classification Search
CPC . G06T 2207/20081; G06T 2207/20084; G06T 7/0012; A01K 29/005; A01K 1/031; A01K 1/01
USPC ......................................................... 382/103
See application file for complete search history.

(56) References Cited

U.S. PATENT DOCUMENTS

| | | | |
|---|---|---|---|
| 2014/0034750 A1* | 2/2014 | Van Kuilenburg | A01K 5/0266 239/71 |
| 2018/0303065 A1* | 10/2018 | Lee | A01K 15/021 |
| 2020/0113158 A1* | 4/2020 | Rishi | G06V 40/20 |
| 2020/0353474 A1* | 11/2020 | Crepeau | B01D 46/4227 |
| 2021/0007320 A1 | 1/2021 | Wu | |
| 2022/0001389 A1* | 1/2022 | Maxwell | B02C 18/0092 |
| 2022/0237906 A1 | 7/2022 | Ueda | |

FOREIGN PATENT DOCUMENTS

| | | |
|---|---|---|
| CN | 112102257 A | 12/2020 |
| JP | 2008048683 A | 3/2008 |
| JP | 2018182531 A | 11/2018 |
| JP | 2020024534 A | 2/2020 |
| JP | 2020190181 A | 11/2020 |

OTHER PUBLICATIONS

English Translation of Chinese Office Action for corresponding Chinese application No. 2022800212968 dated Apr. 30, 2025.
International Search Report for corresponding PCT application No. PCT/JP2022/009497 dated Apr. 26, 2022.

* cited by examiner

| MODEL | | 10/22 | 10/30 | 11/04 | CUMULATIVE SUM |
|---|---|---|---|---|---|
| A | NORMAL ACCURACY RATE | 96% | 94% | 89% | 93% |
| | ABNORMAL ACCURACY RATE | 73% | 89% | 100% | 87% |
| B | NORMAL ACCURACY RATE | 97% | 95% | 93% | 95% |
| | ABNORMAL ACCURACY RATE | 93% | 82% | 84% | 85% |
| C | NORMAL ACCURACY RATE | 85% | 91% | 86% | 88% |
| | ABNORMAL ACCURACY RATE | 86% | 93% | 100% | 92% |

EXCREMENT PROPERTY ESTIMATION MODEL LEARNING DEVICE, EXCREMENT PROPERTY ESTIMATION DEVICE, EXCREMENT PROPERTY ESTIMATION MODEL LEARNING METHOD, EXCREMENT PROPERTY ESTIMATION METHOD, AND PROGRAM

CROSS-REFERENCE TO RELATED APPLICATIONS

The present application is a U.S. National Phase Application pursuant to 35 U.S.C. § 371 of PCT International Application No. PCT/JP2022/009497 filed Mar. 4, 2022, which claims priority to Japanese Patent Application No. 2021-045324, filed Mar. 19, 2021, the contents of each of which are incorporated herein by reference.

TECHNICAL FIELD

The present invention relates to an excrement property estimation model learning device, an excrement property estimation device, an excrement property estimation model learning method, an excrement property estimation method, and a program.

Priority is claimed on Japanese Patent Application No. 2021-045324, filed Mar. 19, 2021, the content of which is incorporated herein by reference.

BACKGROUND ART

When experimental animals such as marmoset are reared, feces property may be used to ascertain the health condition and psychological stress of the animals. In such cases, breeders determine the properties of feces on the basis of the color and shape of the feces, and also check for the presence or absence of vomit. However, a determination of the feces properties is greatly influenced by the ability of the breeder, and a result of determination may differ depending on the proficiency of the breeder. Therefore, it may be attempted to determine the properties of feces using a computer program for image analysis.

CITATION LIST

Patent Literature

Patent Document 1
  Japanese Unexamined Patent Application, First Publication No. 2008-48683

SUMMARY OF INVENTION

Technical Problem

However, animal breeding cages often contain feed as well as feces and vomit. And the color and shape of the feed are often similar to those of the feces. For this reason, conventional image analysis programs that try to determine the properties of feces only by comparison with a reference set in advance by programmers and users sometimes cannot distinguish between feed and feces. For example, the conventional image analysis program is a program that estimates an area of feces and determines that the feces are abnormal feces when an area equal to or greater than a threshold value is observed. As a result, feces and feed may not be distinguished from each other when an abnormality occurs in conditions of animals, such as poor health condition or strong psychological stress, and the properties of feces may not be able to be appropriately estimated. In addition to distinguishing between feces and feed when an abnormality has occurred, feces and feed may not be distinguished even when the conditions of animals are normal, and the properties of feces may not be appropriately estimated. Moreover, such a thing is not limited to feces, and is a common problem for excrement such as vomited vomit.

In view of the circumstances described above, an object of the present invention is to provide a technology for estimating the properties of animal excrement with higher accuracy.

Solution to Problem

According to one aspect of the present invention, an excrement property estimation model learning device includes a training data acquisition unit configured to acquire training data including input-side training data including an excrement space which is a predetermined space where there is excrement from an animal being reared, and learning image data that is image data of a captured image obtained by capturing the excrement space, and a correct label indicating whether any abnormal excrement that is abnormal excrement is reflected in an image shown in the learning image data, an excrement property estimation learning model execution unit configured to use an excrement property estimation learning model, which is a machine learning model for estimating a probability that abnormal excrement is reflected in the learning image data, to estimate the probability that abnormal excrement is reflected in the image shown in the learning image data, and an update unit configured to update, on the basis of a difference between an estimation result from the excrement property estimation learning model execution unit and the correct label, the excrement property estimation learning model such that the difference is reduced.

According to one aspect of the present invention, in the excrement property estimation model learning device described above, the learning image data may be image data of an extracted excrement image that is an image extracted from a captured image in advance, and is an image of excrement whose horizontal projection area is equal to or greater than a predetermined area.

According to one aspect of the present invention, in the excrement property estimation model learning device described above, the learning image data may be image data of an image after image processing has been previously performed on a captured image by a filter that does not allow colors of obstacles that are not excrement but whose color and shape are close to those of excrement within a predetermined reference value to pass through.

According to one aspect of the present invention, in the excrement property estimation model learning device described above, the input-side training data may include information indicating a date and time when the learning image data has been captured.

According to one aspect of the present invention, in the excrement property estimation model learning device described above, the input-side training data may include information indicating the maximum number of animals whose excrement is present in an excrement space.

According to one aspect of the present invention, in the excrement property estimation model learning device described above, the input-side training data may include information indicating a feed given to the animal being reared at a predetermined timing prior to a time when an image is captured by an image-capturing device that obtains a captured image.

According to another aspect of the present invention, an excrement property estimation device includes an analysis target data acquisition unit configured to acquire analysis target data including an excrement space which is a predetermined space where there is excrement from an animal being reared, and image data of a captured image obtained by capturing the excrement space, and an estimation unit configured to estimate a probability that an abnormal excrement is reflected in image data acquired by the analysis target data acquisition unit using a learned excrement property estimation learning model obtained by an excrement property estimation model learning device that includes a training data acquisition unit configured to acquire training data including input-side training data including learning image data that is image data of a captured image and a correct label indicating whether any abnormal excrement that is abnormal excrement is reflected in an image shown in the learning image data, an excrement property estimation learning model execution unit configured to use an excrement property estimation learning model, which is a machine learning model for estimating a probability that abnormal excrement is reflected in the learning image data, to estimate the probability that abnormal excrement is reflected in the image shown in the learning image data, and an update unit configured to update, on the basis of a difference between an estimation result from the excrement property estimation learning model execution unit and the correct label, the excrement property estimation learning model such that the difference is reduced.

According to still another aspect of the present invention, an excrement property estimation model learning method includes a training data acquisition step of acquiring training data including input-side training data including an excrement space which is a predetermined space where there is excrement from an animal being reared, and learning image data that is image data of a captured image obtained by capturing the excrement space, and a correct label indicating whether any abnormal excrement that is abnormal excrement is reflected in an image shown in the learning image data, an excrement property estimation learning model execution step of using an excrement property estimation learning model, which is a machine learning model for estimating a probability that abnormal excrement is reflected in the learning image data, to estimate the probability that abnormal excrement is reflected in the image shown in the learning image data, and an update step of updating, on the basis of a difference between a result of the estimation in the excrement property estimation learning model execution step and the correct label, the excrement property estimation learning model such that the difference is reduced.

According to still another aspect of the present invention, an excrement property estimation method includes an analysis target data acquisition step of acquiring analysis target data including an excrement space, which is a predetermined space where there is excrement from an animal being reared, and image data of a captured image obtained by capturing an image of the excrement space, and an estimation step of estimating a probability that an abnormal excrement is reflected in image data obtained in the analysis target data acquisition step using a learned excrement property estimation learning model obtained by an excrement property estimation model learning device that includes a training data acquisition unit configured to acquire training data including input-side training data including learning image data that is image data of a captured image and a correct label indicating whether any abnormal excrement that is abnormal excrement is reflected in an image shown in the learning image data, an excrement property estimation learning model execution unit configured to use an excrement property estimation learning model, which is a machine learning model for estimating a probability that abnormal excrement is reflected in the learning image data, to estimate the probability that abnormal excrement is reflected in the image shown in the learning image data, and an update unit configured to update, on the basis of a difference between an estimation result from the excrement property estimation learning model execution unit and the correct label, the excrement property estimation learning model such that the difference is reduced.

According to still another aspect of the present invention, a program causes the excrement property estimation model learning device described above to function in a computer.

According to still another aspect of the present invention, a program causes the excrement property estimation device described above to function in a computer.

Advantageous Effects of Invention

According to the present invention, it is possible to estimate the properties of animal excrement with higher accuracy.

DESCRIPTION OF EMBODIMENTS

Embodiment

Figure 1:
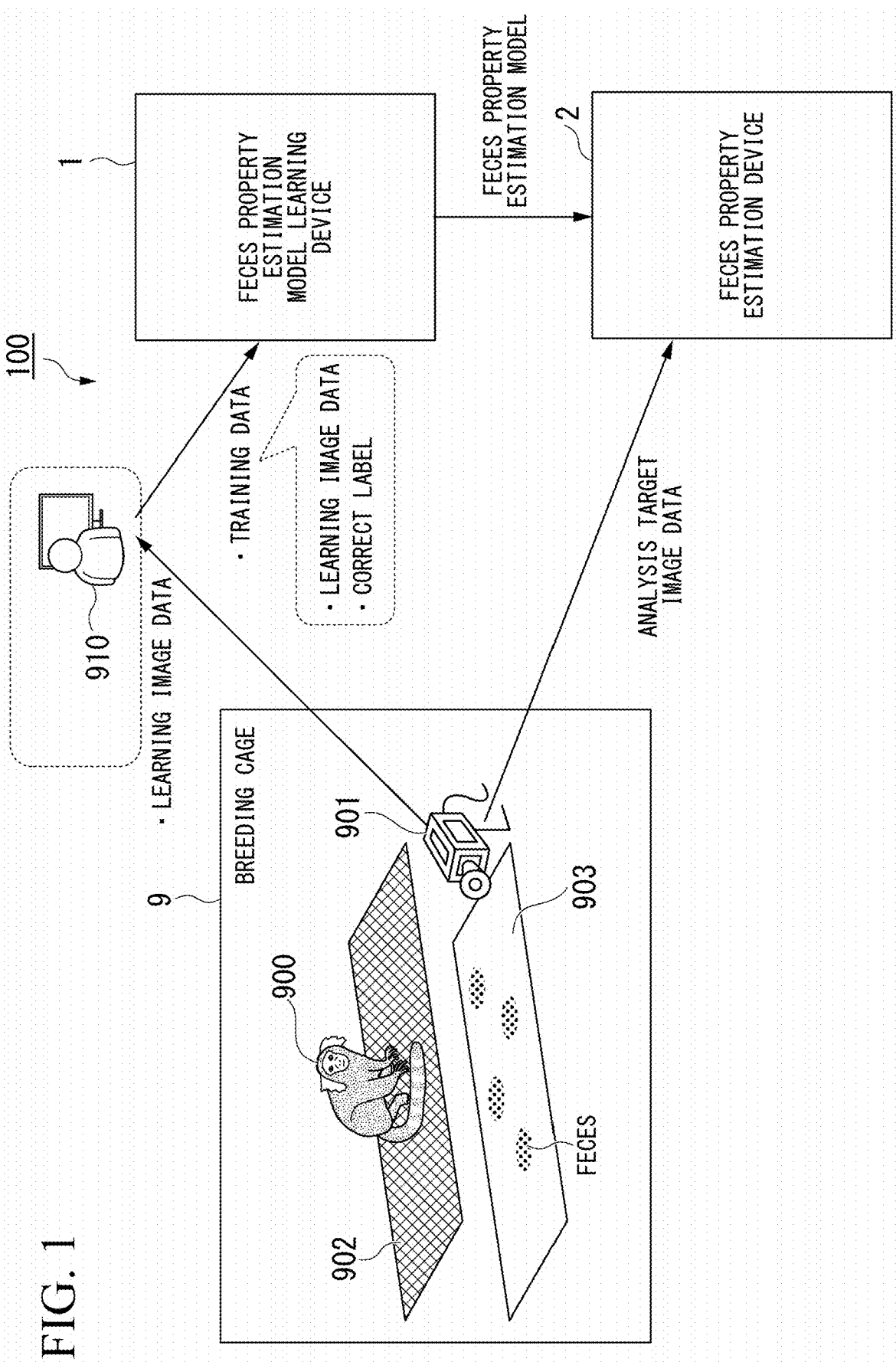
FIG. 1 is a diagram which describes an outline of an excrement property estimation system 100 according to an embodiment.

FIG. 1 is a diagram for describing an outline of an excrement property estimation system 100 of the embodiment. A term "excrement" as used herein includes feces and vomit. To simplify the description below, the excrement property estimation system 100 will be described by taking a case in which the excrement is feces of a breeding animal 900 as an example, but the excrement is not limited to feces. That is, processing executed on feces in the description below may be other excrement such as vomit. The excrement may be a vomit of the breeding animal 900.

The excrement property estimation system 100 obtains information (hereinafter referred to as "relevant information") indicating a relationship between an image as a result of photographing a fecal space (hereinafter referred to as a "captured image") and a probability that an abnormal feces is reflected in the image by a method of machine learning. A fecal space is a predetermined space where feces of an animal being reared are present when at least the animal being reared excretes. A space between a floor mesh 902 and a bedding 903 in FIG. 1 is an example of the fecal space. Abnormal feces are feces whose condition is abnormal. An animal being reared is hereinafter referred to as a breeding animal 900. The breeding animal 900 is, for example, an experimental animal, such as a marmoset. The breeding animal 900 may be an experimental animal such as a mouse, a rat, a guinea pig, a dog, a rabbit, or a rhesus monkey.

The excrement property estimation system 100 obtains relevant information by updating the feces property estimation learning model by a method of machine learning. The feces property estimation learning model is a machine learning model that estimates a probability that an abnormal feces is reflected in the captured image based on a result of capturing an image of a fecal space.

A machine learning model (hereinafter referred to as a "machine learning model") is a mathematical model having one or more types of processing whose execution conditions and order (hereinafter referred to as "execution rules") are determined in advance. To simplify the description below, updating of the machine learning model by the machine learning method is referred to as learning. In addition, the updating of the machine learning model means appropriately adjusting the parameter values in the machine learning model. Moreover, executing the machine learning model means executing processing included in the machine learning model according to execution rules.

The machine learning model is represented by, for example, a neural network. A neural network is a circuit such as an electronic circuit, an electric circuit, an optical circuit, an integrated circuit, or the like, and is a circuit that expresses the machine learning model. Parameters of the neural network are preferably adjusted on the basis of a value of an objective function (for example, a loss). In addition, the parameters of the network are parameters of circuits that constitute the network. A multi-layered neural network model is called a deep learning model. A learning method of the machine learning model is, for example, deep learning.

The breeding animal 900 lives in, for example, a breeding cage 9. The breeding cage 9 is made of metal or plastic that can accommodate the breeding animal 900. To connect the floor mesh 902 to a floor of the breeding cage 9, a floor of a region where the breeding animal 900 defecates may be open. For example, the floor mesh 902 is installed in the breeding cage 9. The floor mesh 902 is made of metal or plastic. The floor mesh 902 is a plate in which holes of a size through which the feces of the breeding animal 900 can pass, but through which the breeding animal 900 itself cannot pass are opened in a mesh shape. In such cases, the breeding animal 900 lives on the floor mesh 902.

The floor mesh 902 is connected to the breeding cage 9 and the open floor. Animals, unlike humans, can tamper with and eat feces. The floor mesh 902 is installed to keep the bedding 903 away from the animals. Learning of a feces property estimation model may include learning using features of feces contours. For this reason, it is desirable that the breeding cage 9 be provided with the floor mesh 902 so that a shape of feces is not disturbed by the animals. In this manner, the floor mesh 902 is installed so that the breeding animal 900 does not tamper with the feces. However, if it is devised to isolate feces from the breeding animal 900, installation of the floor mesh 902 is not essential. To simplify the description, the excrement property estimation system 100 will be described below by taking a case where the floor mesh 902 is installed as an example.

A bedding 903 is installed under the floor mesh 902. The bedding 903 is desirably made of paper that can absorb moisture in order to clearly distinguish between diarrhea and urine.

When the breeding animal 900 lives on the floor mesh 902, the feces of the breeding animal 900 pass through the holes of the floor mesh 902 and fall to the bedding 903. Therefore, feces are present on the bedding 903 before the feces are removed by cleaning after the breeding animal 900 has excreted. Therefore, a space between the floor mesh 902 and the bedding 903 is an example of the fecal space.

An image-capturing device 901 is installed at a position where an image of the fecal space can be captured. For this reason, the feces of the breeding animal 900 are reflected in the captured image before the feces are removed by cleaning after the breeding animal 900 has excreted. The image-capturing device 901 is, for example, a camera. The image-capturing device 901 is, for example, installed at a place where it is possible to capture an image from the front so that the entire bedding 903 can be reflected. The image-capturing device 901 may also be installed above the bedding 903 when the breeding animal 900 is being reared in an environment where the breeding animal 900 does not come on feces even when the image is captured from above. An output of the image-capturing device 901 is, for example, a still image. An image quality of the still image output by the image-capturing device 901 is, for example, an SD image quality (standard image quality) or higher. To simplify the description, the excrement property estimation system 100 will be described below taking a case in which the image-capturing device 901 is an SD image quality camera as an example.

The excrement property estimation system 100 uses a learned feces property estimation learning model (hereinafter referred to as a "feces property estimation model") to estimate whether abnormal feces (hereinafter referred to as "abnormal feces") are reflected in the captured image of a fecal space to be analyzed. The fecal space to be analyzed is a fecal space in which, when a breeding animal whose feces property is to be estimated has excreted, feces of the breeding animal subjected to the estimation are present. The feces property estimation model is an example of the relevant information.

Being learned means that a predetermined termination condition (hereinafter referred to as "learning termination condition") has been satisfied. The learning termination condition is, for example, a condition that learning using training data for a predetermined number of times has terminated. The learning termination condition may be, for example, a condition that a change due to an update of the feces property estimation learning model is smaller than a predetermined change.

The excrement property estimation system 100 includes a feces property estimation model learning device 1 and a feces property estimation device 2. The feces property estimation model learning device 1 uses one or more pieces of training data to update the feces property estimation learning model by the method of machine learning.

The training data includes paired data of input-side training data and correct labels. The input-side training data includes learning image data. The learning image data is image data of the captured image obtained by capturing a fecal space. That is, the learning image data is image data of the captured image of a fecal space. When a plurality of pieces of training data are used for learning, an image in which feces are not present in an image indicated by the learning image data may be used for learning. That is, when the plurality of pieces of training data are used for learning, all of the plurality of pieces of learning image data do not have to be image data of an image in which a fecal space where feces are present is reflected. When the plurality of pieces of training data are used for learning, some pieces of the learning image data may be image data of an image in which a fecal space where feces are not present is reflected.

A correct label is information indicating whether an abnormal feces is reflected in an image of corresponding learning image data. The correct label is a result of determining in advance whether an abnormal feces is reflected in the image of the learning image data by a person or a computer who determines abnormal feces, such as a specialist 910 who is skilled in distinguishing feces properties.

The feces property estimation device 2 uses a feces property estimation model obtained by the feces property estimation model learning device 1 to estimate whether an abnormal feces is reflected in the captured image (hereinafter referred to as an "analysis target image") of a fecal space to be analyzed. More specifically, the feces property estimation device 2 acquires analysis target data including image data of the analysis target image (hereinafter referred to as "analysis target image data"), and a feces property estimation model obtained by the feces property estimation model learning device 1 is used to estimate a probability that an abnormal feces is reflected in the analysis target image.

Figure 2:
FIG. 2 is a diagram which shows a first example of a captured image of a fecal space in the embodiment.

FIG. 2 is a diagram which shows a first example of the captured image of a fecal space in the embodiment. The floor mesh 902 and the bedding 903 are reflected in the image shown in FIG. 2. A plurality of feces are reflected in the region D1 in the image shown in FIG. 2. A plurality of feeds are reflected in a region D2 in the image shown in FIG. 2.

As shown in the image of FIG. 2, feces and feeds are similar in color and shape. A space between the floor mesh 902 and the bedding 903 in FIG. 2 is an example of the fecal space.

Figure 3:
FIG. 3 is a diagram which shows a second example of the captured image of a fecal space in the embodiment.

FIG. 3 is a diagram which shows a second example of the captured image of a fecal space in the embodiment. An abnormal feces is not reflected in the captured image in FIG. 3.

Figure 4:
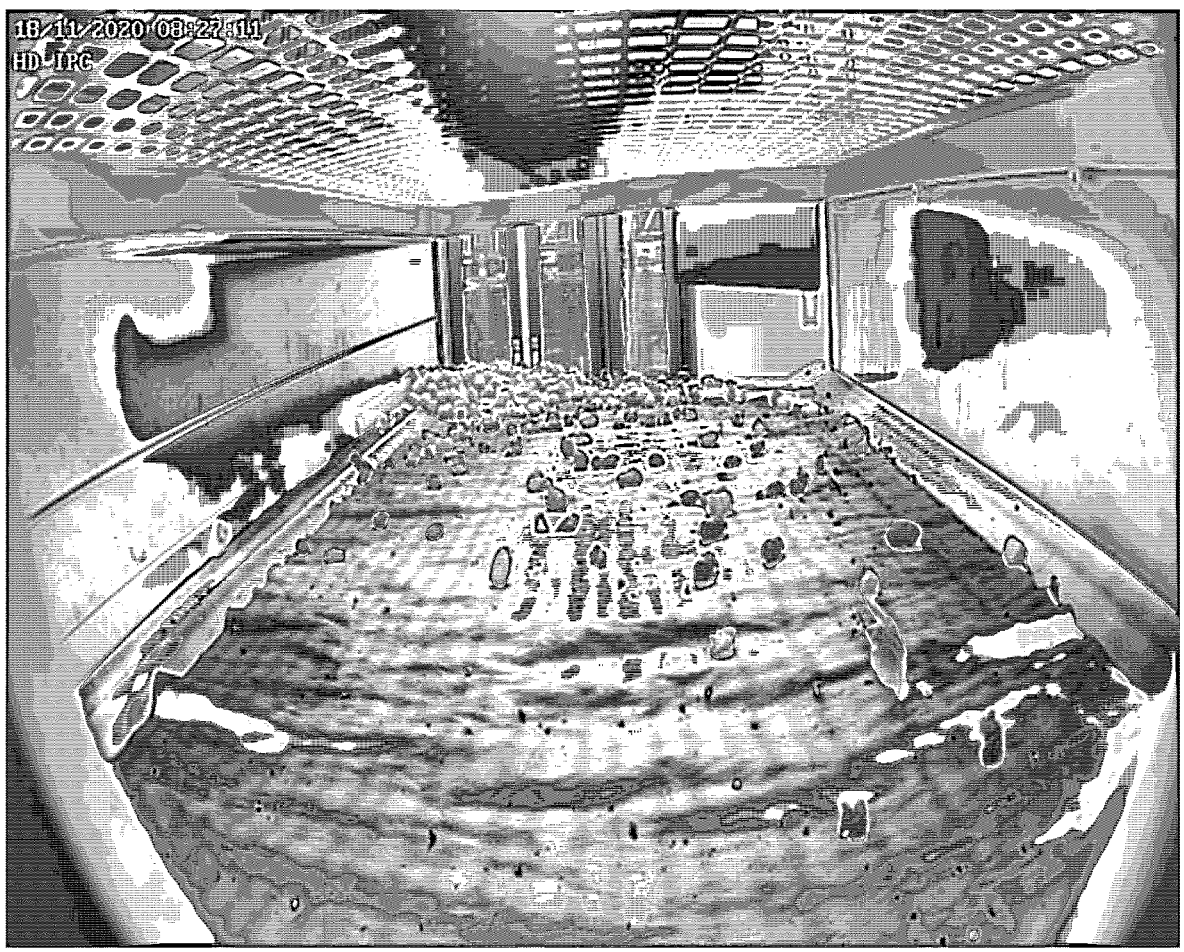
FIG. 4 is a diagram which shows a third example of the captured image of a fecal space in the embodiment.

FIG. 4 is a diagram which shows a third example of the captured image of a fecal space in the embodiment. An abnormal feces is not reflected in the captured image in FIG. 4.

Figure 5:
FIG. 5 is a diagram which shows a fourth example of the captured image of a fecal space in the embodiment.

FIG. 5 is a diagram which shows a fourth example of the captured image of a fecal space in the embodiment. In the captured image of FIG. 5, an abnormal feces is reflected in a region D3.

Figure 6:
FIG. 6 is a diagram which shows a fifth example of the captured image of a fecal space in the embodiment.

FIG. 6 is a diagram which shows a fifth example of the captured image of a fecal space in the embodiment. An abnormal feces is not reflected in the captured image of FIG. 6.

Figure 7:
FIG. 7 is a diagram which shows a sixth example of the captured image of a fecal space in the embodiment.

FIG. 7 is a diagram which shows a sixth example of the captured image of a fecal space in the embodiment. In the captured image of FIG. 7, an abnormal feces is reflected in a region D4 and a region D5.

Figure 8:
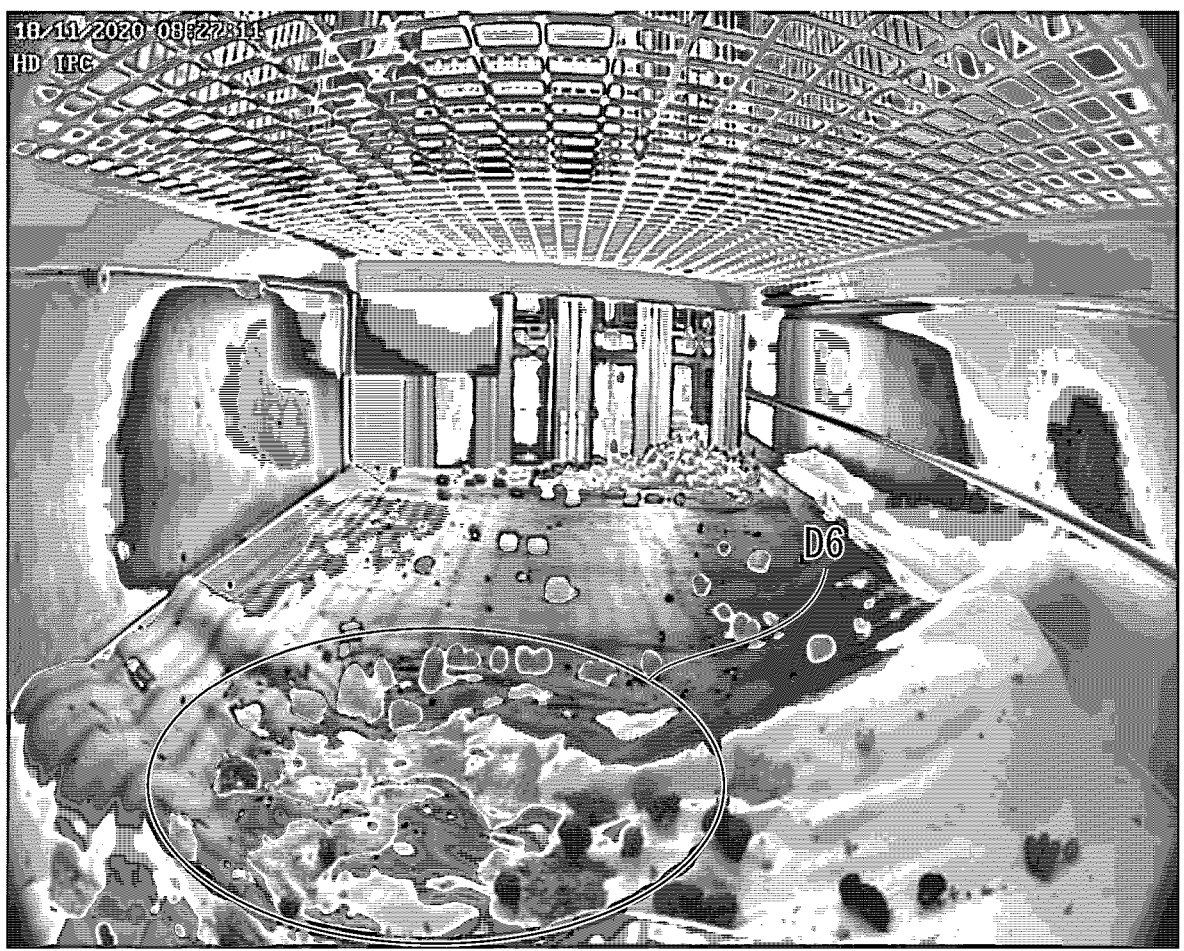
FIG. 8 is a diagram which shows a seventh example of the captured image of a fecal space in the embodiment.

FIG. 8 is a diagram which shows a seventh example of the captured image of a fecal space in the embodiment. In the captured image of FIG. 8, an abnormal feces is reflected in a region D6.

Figure 9:
FIG. 9 is a diagram which shows an eighth example of the captured image of a fecal space in the embodiment.

FIG. 9 is a diagram which shows an eighth example of the captured image of a fecal space in the embodiment. An abnormal feces is not reflected in the captured image of FIG. 9.

Figure 10:
FIG. 10 is a diagram which shows a ninth example of the captured image of a fecal space in the embodiment.

FIG. 10 is a diagram which shows a ninth example of the captured image of a fecal space in the embodiment. In the captured image of FIG. 10, an abnormal feces is reflected in a region D7.

Figure 11:
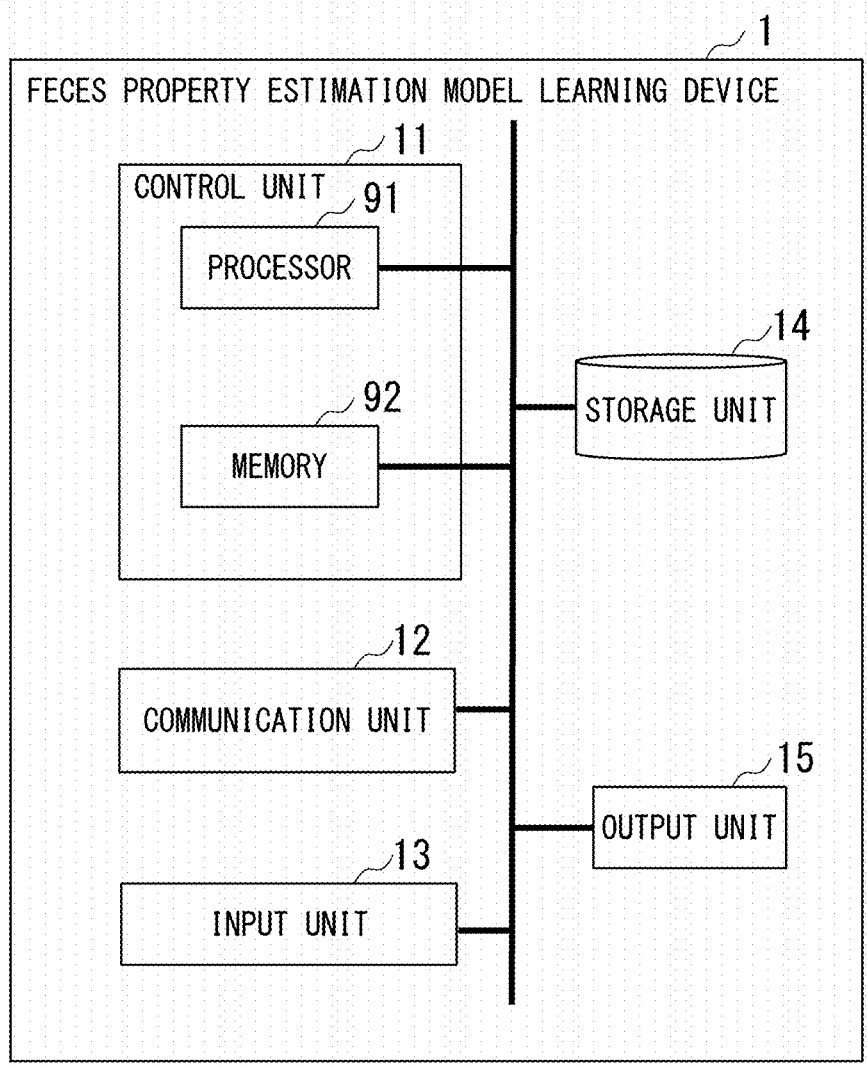
FIG. 11 is an example of hardware configuration of a feces property estimation model learning device 1 in the embodiment.

FIG. 11 is a diagram which shows an example of a hardware configuration of the feces property estimation model learning device 1 in the embodiment. The feces property estimation model learning device 1 includes a control unit 11 having a processor 91 such as a central processing unit (CPU) and a memory 92 connected using a bus, and executes a program. The feces property estimation model learning device 1 functions as a device including a control unit 11, a communication unit 12, an input unit 13, a storage unit 14, and an output unit 15 by executing the program.

More specifically, in the feces property estimation model learning device 1, the processor 91 reads the program stored in the storage unit 14 and stores the read program in the memory 92. The feces property estimation model learning device 1 functions as the device including the control unit 11, the communication unit 12, the input unit 13, the storage unit 14, and the output unit 15 by the processor 91 executing the program stored in the memory 92.

The control unit 11 controls an operation of each functional unit provided in the feces property estimation model learning device 1. The control unit 11 performs, for example, learning of a feces property estimation learning model. The control unit 11 records, for example, a result of the learning in the storage unit 14. The control unit 11 controls, for example, an operation of the communication unit 12.

The communication unit 12 is configured to include a communication interface for connecting the feces property estimation model learning device 1 to an external device. The communication unit 12 communicates with an external device with wire or wirelessly. An external device of a communication destination of the communication unit 12 is, for example, the feces property estimation device 2. The communication unit 12 transmits, for example, a feces property estimation model to the feces property estimation device 2. The external device may be, for example, a transmission source device of the training data. In such a case, the communication unit 12 receives the training data through communication with the transmission source device of the training data.

The input unit 13 is configured to include input devices such as a mouse, a keyboard, and a touch panel. The input unit 13 may be configured as an interface connecting these input devices to the feces property estimation model learning device 1. The input unit 13 receives an input of various types of information on the feces property estimation model learning device 1. For example, training data may be input to the input unit 13. An external storage device such as a universal serial bus (USB) memory may be connected to the input unit 13.

The storage unit 14 is configured using a non-temporary computer-readable storage medium device such as a magnetic hard disk device or a semiconductor storage device. The storage unit 14 stores various types of information on the feces property estimation model learning device 1. The storage unit 14 stores, for example, a program for controlling the operation of each functional unit provided in the feces property estimation model learning device 1 in advance. The storage unit 14 stores, for example, a feces property estimation learning model in advance. The storage unit 14 stores, for example, an updated feces property estimation learning model.

Note that the training data does not necessarily have to be input only to the communication unit 12, nor does it necessarily have to be input only to the input unit 13. Each type of information included in the training data may be input from either the communication unit 12 or the input unit 13. For example, the input-side training data may be input to the communication unit 12 and correct labels corresponding to the input-side training data input to the communication unit 12 may be input to the input unit 13. In addition, the training data does not necessarily have to be acquired from the communication unit 12 or the input unit 13, and may be stored in the storage unit 14 in advance.

The output unit 15 outputs various types of information. The output unit 15 is configured to include, for example, a display device such as a cathode ray tube (CRT) display, a liquid crystal display, or an organic electro-luminescence (EL) display. The output unit 15 may be configured as an interface connecting these display devices to the faces property estimation model learning device 1. The output unit 15 outputs, for example, information input to the input unit 13. The output unit 15 may display, for example, training data input to the communication unit 12 or the input unit 13. The output unit 15 may display, for example, a result of the execution of the feces property estimation learning model.

Figure 12:
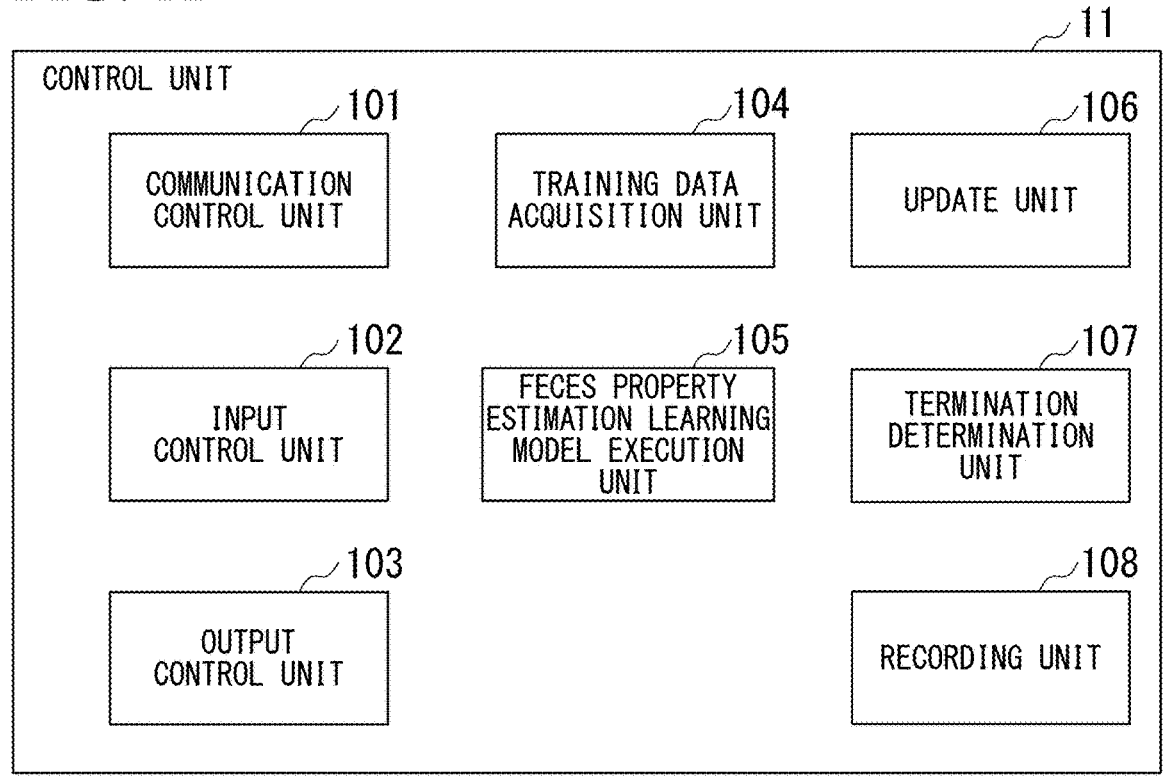
FIG. 12 is a diagram which shows an example of a functional configuration of a control unit 11 in the embodiment.

FIG. 12 is a diagram which shows an example of a functional configuration of the control unit 11 in the embodiment. The control unit 11 includes a communication control unit 101, an input control unit 102, an output control unit 103, a training data acquisition unit 104, a feces property estimation learning model execution unit 105, an update unit 106, a termination determination unit 107, and a recording unit 108.

The communication control unit 101 controls the operation of the communication unit 12. The communication unit 12 transmits the learned feces property estimation learning model to the feces property estimation device 2 under control of the communication control unit 101. The input control unit 102 controls an operation of the input unit 13. The output control unit 103 controls an operation of the output unit 15.

The training data acquisition unit 104 acquires the training data input to the communication unit 12 or the input unit 13. The training data acquisition unit 104 may read the training data from the storage unit 14 when the training data has been recorded in the storage unit 14 in advance.

The feces property estimation learning model execution unit 105 executes learning of a feces property estimation learning model for the input-side training data included in the training data acquired by the training data acquisition unit 104. By executing the learning of the feces property estimation learning model, the feces property estimation learning model execution unit 105 estimates a probability that an abnormal feces is reflected in an image indicated by the learning image data.

The update unit 106 updates the feces property estimation learning model based on an estimation loss, which is a difference between an estimation result of the feces property estimation learning model execution unit 105 and a correct label included in the training data acquired by the training data acquisition unit 104. The estimation result of the feces property estimation learning model execution unit 105 is represented by two components: a component indicating the probability that an abnormal feces is reflected in the image indicated by the learning image data and a component indicating the probability that an abnormal feces is not reflected in the image indicated by the learning image data. A correct label is represented by, for example, two components. One component of the two components representing the correct label is 1 when an abnormal feces is reflected in the image indicated by the learning image data, and is 0 when an abnormal feces is not reflected in the image indicated by the learning image data. The other component of the two components representing the correct label is 0 when an abnormal feces is reflected in the image indicated by the learning image data, and is 1 when an abnormal feces is not reflected in the image indicated by the learning image data.

When the estimation result and the correct label of the feces property estimation learning model execution unit 105 are represented by such two components, the estimation loss is represented by, for example, an inner product of a two-component tensor indicating the estimation result of the feces property estimation learning model execution unit 105 and a two-component tensor indicating the correct label. In this manner, the estimation result and correct label of the feces property estimation learning model execution unit 105 are represented by, for example, tensors. The tensor indicating the estimation result of the feces property estimation learning model execution unit 105 and the tensor indicating the correct label may be a first-order tensor (that is, a vector), a second-order tensor (that is, a matrix), or a three-order or higher tensor.

The termination determination unit 107 determines whether the learning termination condition is satisfied. The recording unit 108 records various types of information in the storage unit 14.

Figure 13:
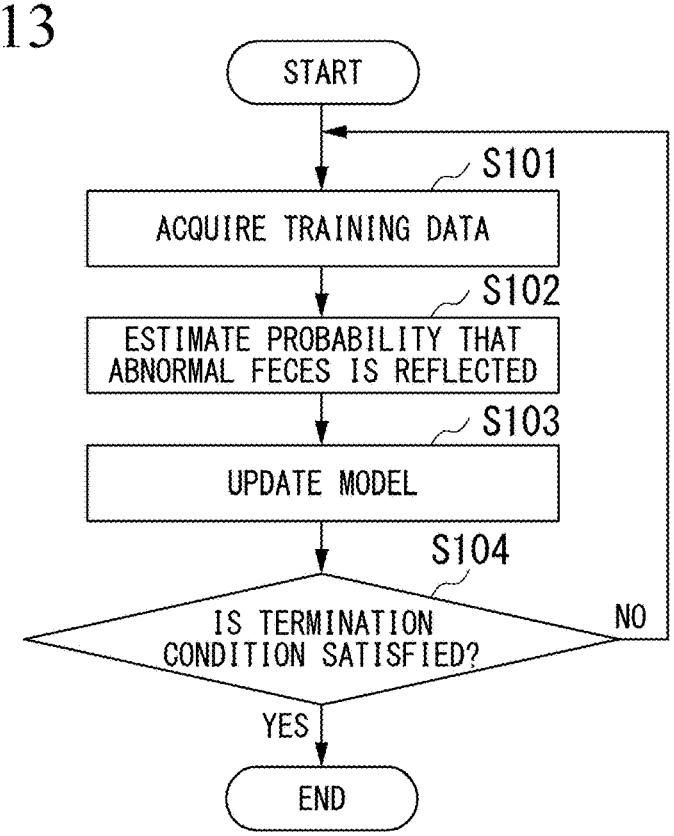
FIG. 13 is a flowchart which shows an example of a flow of processing executed by the feces property estimation model learning device 1 of the embodiment.

FIG. 13 is a flowchart which shows an example of a flow of processing executed by the feces property estimation model learning device 1 of the embodiment. Training data is input to the communication unit 12 or the input unit 13, and the training data acquisition unit 104 acquires the input training data (step S101).

Next, the feces property estimation learning model execution unit 105 executes a feces property estimation learning model for input-side training data included in the training data acquired in step S101 (step S102). By executing the feces property estimation learning model, the feces property estimation learning model execution unit 105 estimates a probability that an abnormal feces is reflected in an image indicated by the learning image data acquired in step S101.

Next, the update unit 106 updates the feces property estimation learning model so as to reduce a difference between a result of the estimation obtained in step S102 and a correct label included in the training data obtained in step S101 based on the difference (step S103).

Next, the termination determination unit 107 determines whether the learning termination condition is satisfied (step S104). When the learning termination condition is satisfied (YES in step S104), the processing ends. On the other hand, when the learning termination condition is not satisfied (NO in step S104), the process returns to step S101.

Figure 14:
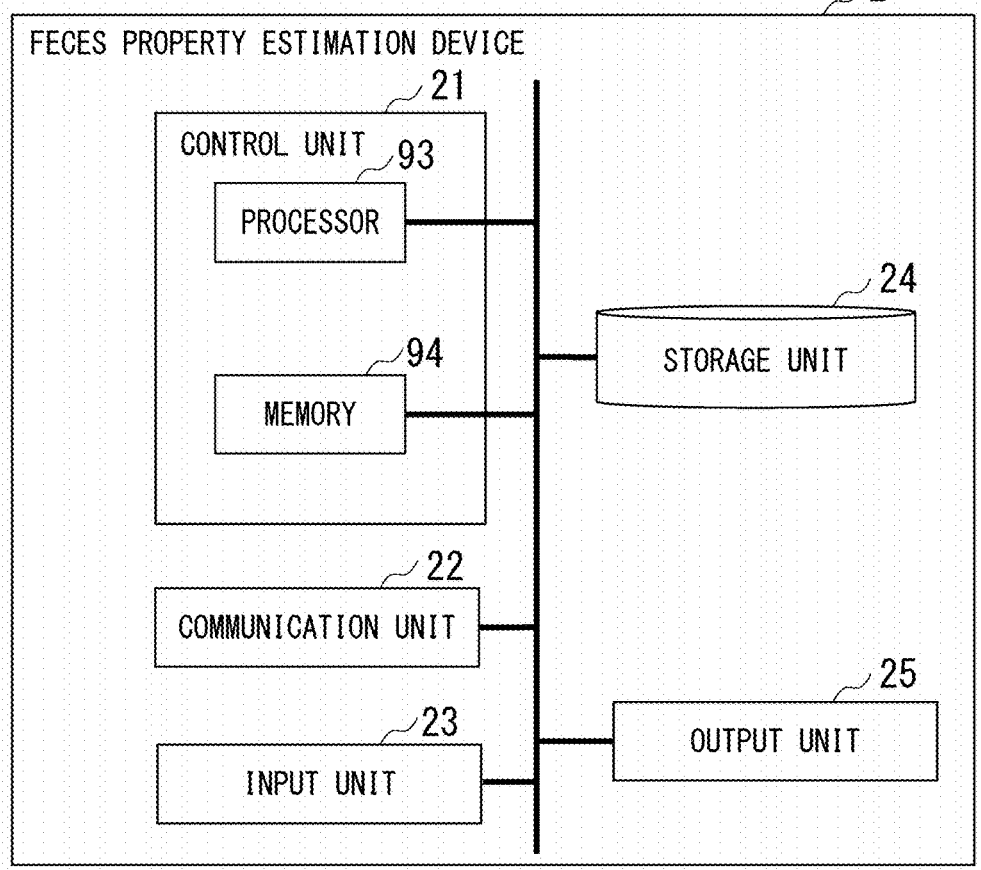
FIG. 14 is a diagram which shows an example of hardware configuration of a feces property estimation device 2 in the embodiment.

FIG. 14 is a diagram which shows an example of a hardware configuration of the feces property estimation device 2 in the embodiment. The feces property estimation device 2 includes a control unit 21 having a processor 93 such as a CPU and a memory 94 connected using a bus, and executes a program. The feces property estimation device 2 functions as a device having a control unit 21, a communication unit 22, an input unit 23, a storage unit 24, and an output unit 25 by executing the program.

More specifically, in the feces property estimation device 2, the processor 93 reads the program stored in the storage unit 24, and thereby the read program is stored in the memory 94. The feces property estimation device 2 functions as the device having the control unit 21, the communication unit 22, the input unit 23, the storage unit 24, and the output unit 25 by the processor 93 executing the program stored in the memory 94.

The control unit 21 controls the operation of each functional unit provided in the feces property estimation device 2. The control unit 21 executes, for example, the feces property estimation model. The control unit 21 records, for example, a result of the execution of the feces property estimation model in the storage unit 24. The control unit 21 controls, for example, an operation of the communication unit 22.

The communication unit 22 is configured to include a communication interface for connecting the feces property estimation device 2 to an external device. The communication unit 22 communicates with an external device with wire or wirelessly. An external device of a communication destination of the communication unit 22 is, for example, the feces property estimation model learning device 1. The communication unit 22 receives, for example, the feces property estimation model from the feces property estimation model learning device 1.

The external device may be, for example, a transmission source device of the analysis target data. In such a case, the communication unit 22 receives the analysis target data through communication with the transmission source device of the analysis target data.

The input unit 23 includes input devices such as a mouse, a keyboard, and a touch panel. The input unit 23 may be configured as an interface connecting these input devices to the feces property estimation device 2. The input unit 23 receives an input of various types of information to the feces property estimation device 2. For example, analysis target data may be input to the input unit 23. An external storage device such as a universal serial bus (USB) memory may be connected to the input unit 23.

The storage unit 24 is configured using a non-temporary computer-readable storage medium device such as a magnetic hard disk device or a semiconductor storage device. The storage unit 24 stores various types of information on the feces property estimation device 2. The storage unit 24 stores, for example, a program for controlling the operation of each functional unit provided in the feces property estimation device 2. The storage unit 24 stores, for example, the feces property estimation model obtained by the feces property estimation model learning device 1 in advance. The storage unit 24 stores, for example, an estimation result of the feces property estimation model.

Note that the analysis target data does not necessarily have to be input only to the communication unit 22, nor does it have to be input only to the input unit 23. The analysis target data may be input from either the communication unit 22 or the input unit 23. In addition, the analysis target data does not necessarily have to be acquired from the communication unit 22 or the input unit 23, and may be stored in the storage unit 24 in advance.

The output unit 25 outputs various types of information. The output unit 25 is configured to include a display device such as a CRT display, a liquid crystal display, or an organic EL display. The output unit 25 may also be configured as an interface connecting these display devices to the feces property estimation device 2. The output unit 25 outputs, for example, information input to the input unit 23. The output unit 25 may also display, for example, the analysis target data input to the communication unit 22 or the input unit 23. The output unit 25 may display, for example, an execution result of the feces property estimation model. The output unit 25 outputs, for example, a result of estimating a state of feces and individual information.

Figure 15:
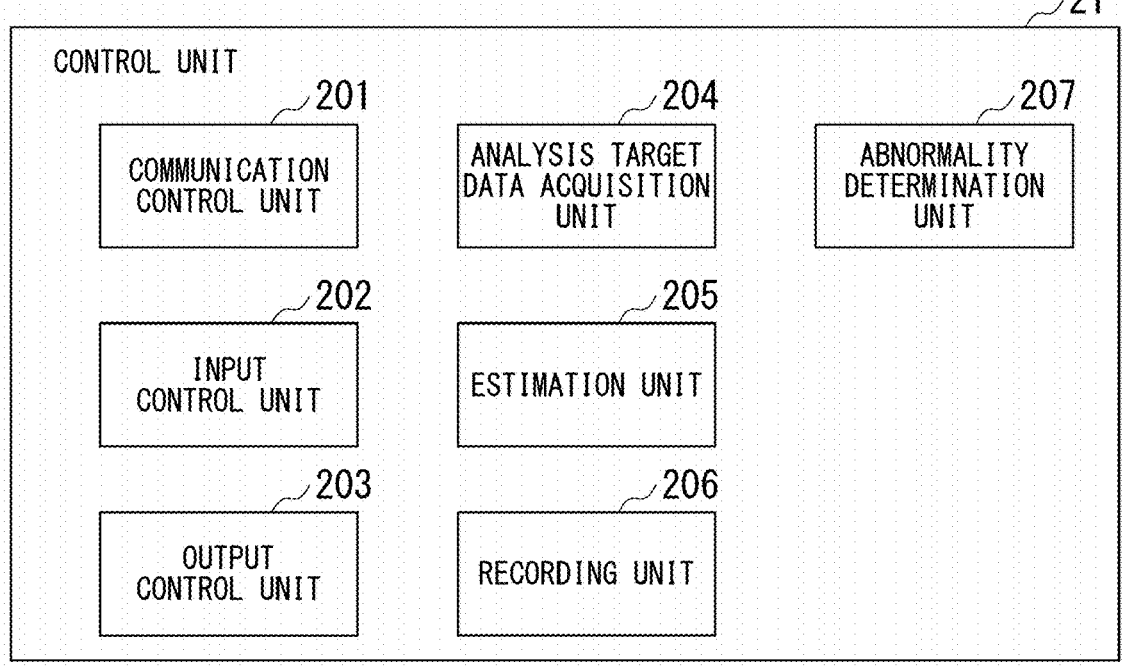
FIG. 15 is a diagram which shows an example of a functional configuration of a control unit 21 in the embodiment.

FIG. 15 is a diagram which shows an example of a functional configuration of the control unit 21 in the embodiment. The control unit 21 includes a communication control unit 201, an input control unit 202, an output control unit 203, an analysis target data acquisition unit 204, an estimation unit 205, a recording unit 206, and an abnormality determination unit 207.

The communication control unit 201 controls the operation of the communication unit 22. The input control unit 202 controls an operation of the input unit 23. The output control unit 203 controls an operation of the output unit 25.

The analysis target data acquisition unit 204 acquires the analysis target data input to the communication unit 22 or the input unit 23. The analysis target data acquisition unit 204 may read the analysis target data from the storage unit 24 when the analysis target data has been recorded in the storage unit 24 in advance.

The estimation unit 205 executes a feces property estimation model on the analysis target data acquired by the analysis target data acquisition unit 204. By executing the feces property estimation model, the estimation unit 205 estimates the probability that an abnormal feces is reflected in an analysis target image included in the analysis target data.

The recording unit 206 records various types of information in the storage unit 24.

The abnormality determination unit 207 determines whether the estimated probability of the estimation unit 205 is greater than or equal to a predetermined probability. The abnormality determination unit 207 controls the operation of the communication unit 22 or the output unit 25 and notifies a predetermined notification destination of a warning when the estimated probability of the estimation unit 205 is greater than or equal to a predetermined probability. The predetermined notification destination may be, for example, the output unit 25 itself. The predetermined notification destination may be, for example, a predetermined external device of the communication destination of the communication unit 22.

Figures 16, 17:
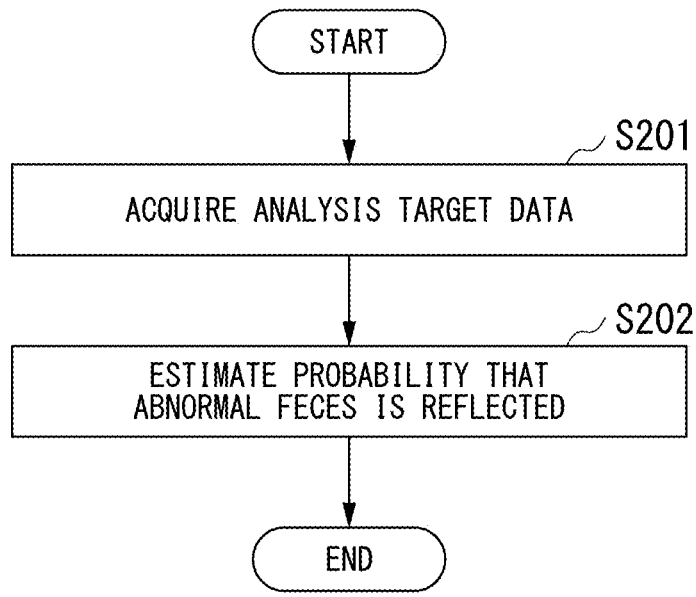
FIG. 16 is a flowchart which shows an example of a flow of processing executed by the feces property estimation device 2 in the embodiment.
FIG. 17 is a diagram which shows an example of an experimental result of estimation of abnormal feces using the excrement property estimation system 100 of the embodiment.

FIG. 16 is a flowchart which shows an example of a flow of processing executed by the feces property estimation device 2 in the embodiment. The analysis target data acquisition unit 204 acquires analysis target data (step S201). Note that the processing of step S201 is executed, for example, at a timing when the image-capturing device 901 is started by a timer. An image quality of the analysis target image data obtained in the processing of step S201 is preferably the same as that of the learning image data. Next, the estimation unit 205 executes the feces property estimation model to estimate the probability that an abnormal feces is reflected in the analysis target image data acquired in step S201 (step S202). The estimation result is displayed in, for example, the output unit 25. The estimation result may be notified to the predetermined external device via, for example, the communication unit 22. For example, as a result of the estimation, when the probability of having abnormal feces is estimated, the output unit 25 may display that the probability of having abnormal feces is high, and the predetermined external device may also be notified that there is a high probability of having abnormal feces via the communication unit 22.

Experimental Result

FIG. 17 is a diagram which shows an example of an experimental result of the estimation of abnormal feces using the excrement property estimation system 100 of the embodiment. In the experiment, the breeding animal 900 was a common marmoset. In the experiment, as training data, data including an image obtained by the image-capturing device 901 and a result of determining, by a specialist, whether normal feces or an abnormal feces is reflected in the image are used. As the training data in the experiment, 1000 pieces of abnormal feces data and 10000 pieces of normal feces data were used. In the experiment, images obtained for three days different from a day when an image of the training data was obtained were roughly divided into two images of normal feces and abnormal feces. Data on a first day of test data has 132 normal feces images. There were 15 abnormal feces images in the data on the first day of the test data. Data on a second day of the test data have 252 normal feces images. In the data on the second day of the test data, there were 29 abnormal feces images. Data on a third day of the test data have 165 normal feces images. The data on the third day of the test data have 13 abnormal feces images. In the experiment, an accuracy rate was calculated for these types of data. The three days were specifically October 22nd, October 30th, and November 4th.

FIG. 17 shows a result of estimating whether an abnormal feces is reflected for the analysis target image data on October 22nd, October 30th and November 4th using a plurality of machine learning models of a model A, a model B, and a model C. The model A is a model obtained by adding a fully connected layer to VGG16 in Keras using Tensorflow and Keras of an open source library and performing transfer learning thereon. The model B is a model obtained by adding a fully connected layer to Xception in Keras using Tensorflow and Keras of the open source library and performing transfer learning thereon. The model C is a model obtained by adding a fully connected layer to VGG19 in Keras using Tensorflow and Keras of the open source library and performing transfer learning thereon. FIG. 17 shows that the excrement property estimation system 100 succeeds in estimating abnormal feces with high probability in any of the models A to C. Specifically, FIG. 17 shows that a cumulative accuracy rate is 85% or more in all three deep learning models. FIG. 17 shows that the accuracy rate is 90% or more for data on October 22nd in the model B. FIG. 17 shows that the accuracy rate is 90% or more for data on October 30th in the model C.

In this manner, the feces property estimation model learning device 1 uses training data including input-side training data and correct labels to acquire relevant information indicating a relationship between the image of the fecal space and the probability that an abnormal feces is reflected in this image. Then, the feces property estimation device 2 uses the relevant information obtained by the feces property estimation model learning device 1 to estimate the probability that an abnormal feces is reflected in the analysis target image data.

The feces property estimation model learning device 1 of the embodiment configured in this manner obtains the feces property estimation model through learning. For this reason, the feces property estimation model learning device 1 makes it possible to estimate feces properties of animals with higher accuracy.

In addition, the excrement property estimation system 100 of the embodiment configured in this manner includes a feces property estimation device 2 that executes the feces property estimation model obtained by the feces property estimation model learning device 1. For this reason, the excrement property estimation system 100 is capable of estimating the feces properties of animals with higher accuracy.

In addition, the excrement property estimation system 100 of the embodiment configured in this manner estimates the feces of the breeding animal 900 being reared in the breeding cage 9 having the floor mesh 902. Since the floor mesh 902 is present as described above, the possibility that the feces are tampered with by the breeding animal 900 is low, and the shape of the feces is less likely to collapse. Therefore, a feces property estimation model can be obtained with high estimation accuracy. For this reason, the excrement property estimation system 100 is capable of estimating the feces properties of animals with higher accuracy.

In addition, on the bedding 903 of the breeding cage 9, in addition to feces and urine, various things such as feeds, sawdust, and feed box fragments fall. In particular, the feeds are closely similar to normal feces in area and shape. In addition, there is no uniformity in falling positions of feces, and they randomly fall. Furthermore, a shape of abnormal feces also changes organically. The feces property estimation model learning device 1 uses an image captured by the image-capturing device 901, for example, an image that includes not only a video of feces but also information around the feces in an entire image of the bedding 903 for learning. Therefore, the feces property estimation model learning device 1 can obtain a feces property estimation model in which an influence of information other than feces is low and an influence of information on the feces is high for estimation. For this reason, the feces property estimation model learning device 1 makes it possible to estimate the feces properties of animals with higher accuracy.

Moreover, as described above, the image-capturing device 901 is not a special camera or an expensive camera, but an SD standard image quality camera. For this reason, the excrement property estimation system 100 can estimate the state of feces using an image captured by a general camera with an SD standard image quality instead of using a special camera or an expensive camera. The excrement property estimation system 100 is capable of estimating the state of feces even with a monochrome image.

The excrement property estimation system 100 makes it possible to automatically detect abnormal feces, which is one of animal health indicators, using a computer instead of human power. For this reason, the excrement property estimation system 100 enables labor saving in animal health management in animal breeding facilities.

Modified Example

The excrement property estimation system 100 may include the feces property estimation device 2a in place of the feces property estimation device 2. The feces property estimation device 2a determines excrement property for each of a plurality of breeding cages 9.

Figure 18:
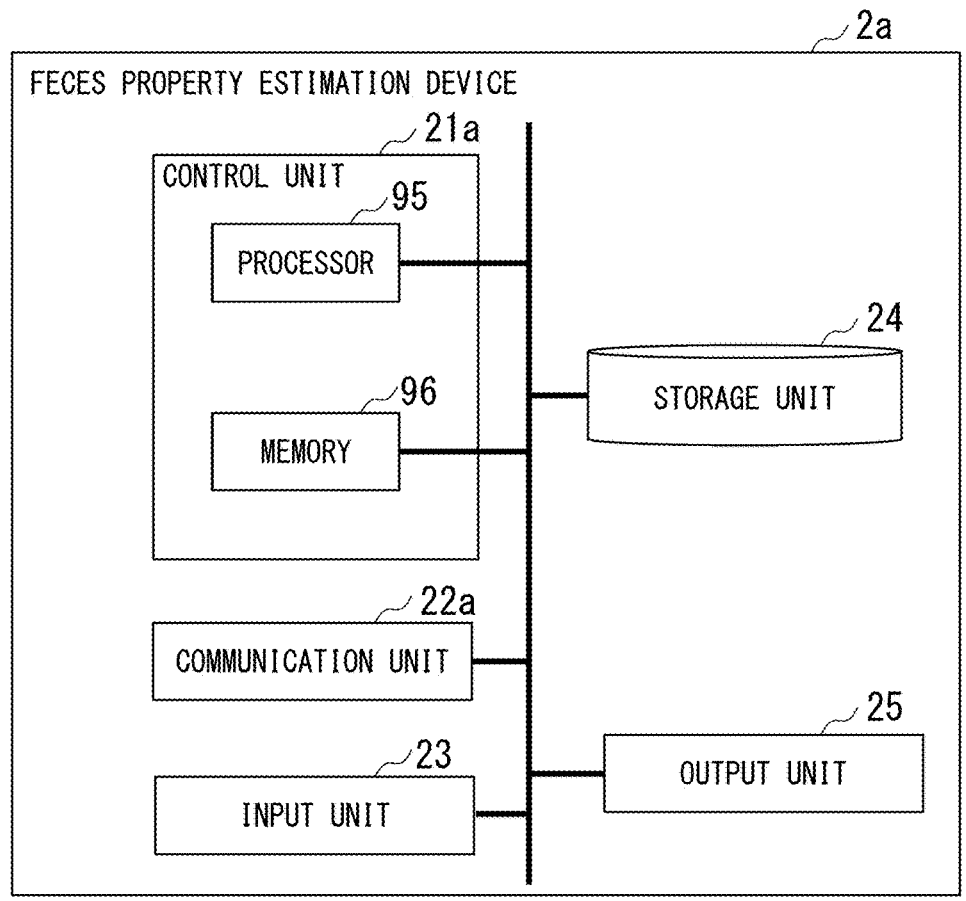
FIG. 18 is a diagram which shows an example of a hardware configuration of a feces property estimation device 2a in a modified example.

FIG. 18 is a diagram which shows an example of a hardware configuration of the feces property estimation device 2a in the modified example. In the following description, devices having functions similar to those of the feces property estimation device 2 are denoted by the same reference numerals as in FIG. 14, and descriptions thereof will be omitted. The feces property estimation device 2a has a control unit 21a having a processor 95 such as a CPU and a memory 96 connected by a bus, and executes a program. The feces property estimation device 2a functions as a device having the control unit 21a, a communication unit 22a, an input unit 23, a storage unit 24, and an output unit 25 by executing a program.

More specifically, in the feces property estimation device 2a, the processor 95 reads the program stored in the storage unit 24 and stores the read program in the memory 96. The feces property estimation device 2a functions as the device having the control unit 21a, the communication unit 22a, the input unit 23, the storage unit 24, and the output unit 25 by the processor 95 executing the program stored in the memory 96.

The control unit 21a controls the operation of each functional unit provided in the feces property estimation device 2a. The control unit 21a executes, for example, a feces property estimation model for each of the plurality of breeding cages 9. The control unit 21a records, for example, an execution result of the feces property estimation model in the storage unit 24. The control unit 21a controls, for example, an operation of the communication unit 22a.

The communication unit 22a is configured to include a communication interface for connecting the feces property estimation device 2a to an external device. The communication unit 22a communicates with the external device with wire or wirelessly. The external device of the communication destination of the communication unit 22a is, for example, the feces property estimation model learning device 1. The communication unit 22a acquires, for example, the feces property estimation model from the feces property estimation model learning device 1.

The external device is, for example, an image-capturing device 901 installed in each of the plurality of breeding cages 9. The communication unit 22a receives analysis target data for each breeding cage 9 through communication with each image-capturing device 901.

Figure 19:
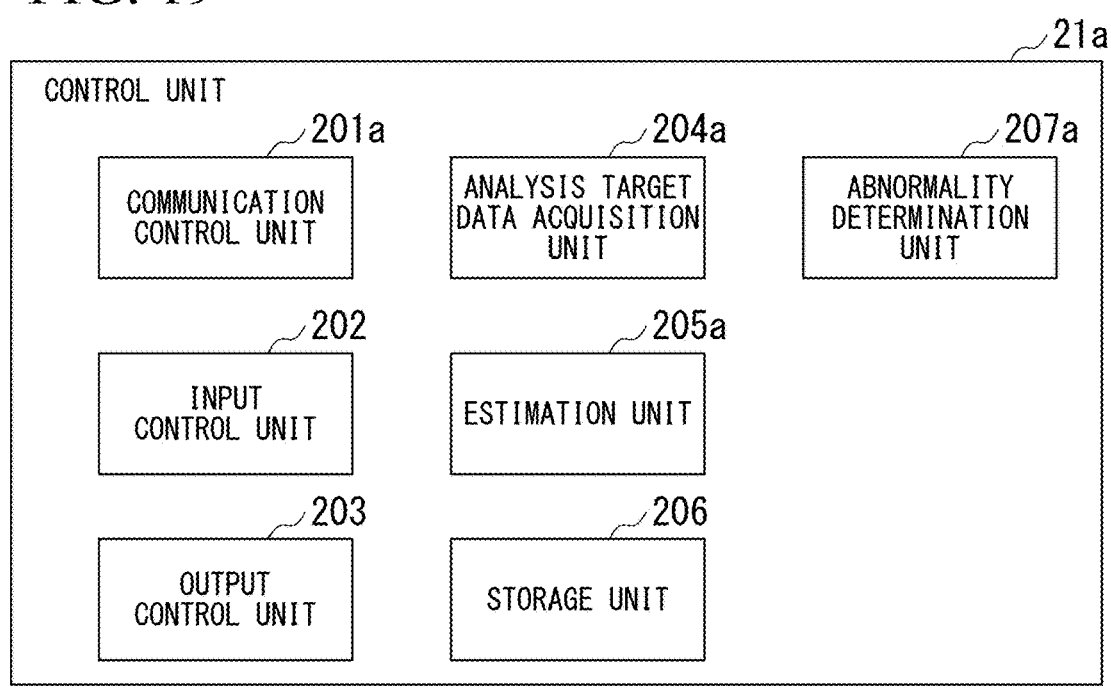
FIG. 19 is a diagram which shows an example of a functional configuration of a control unit 21a in the modified example.

FIG. 19 is a diagram which shows an example of a functional configuration of the control unit 21a in the modified example. In the following description, components having functions similar to those of the control unit 21 are denoted by the same reference numerals as in FIG. 15, and descriptions thereof will be omitted. The control unit 21a includes a communication control unit 201a, an input control unit 202, an output control unit 203, an analysis target data acquisition unit 204a, an estimation unit 205a, a recording unit 206, and an abnormality determination unit 207a.

The communication control unit 201a controls the operation of the communication unit 22a.

The analysis target data acquisition unit 204a acquires analysis target data of each breeding cage 9 input to the communication unit 22a.

The estimation unit 205a executes the feces property estimation model for each breeding cage 9 on the analysis target data of each breeding cage 9 acquired by the analysis target data acquisition unit 204a. By executing the feces property estimation model, the estimation unit 205a estimates the probability that an abnormal feces is reflected in the analysis target image included in the analysis target data for each breeding cage 9.

The abnormality determination unit 207a determines for each breeding cage 9 whether the probability estimated by the estimation unit 205a is equal to or greater than a predetermined probability. When an abnormal breeding cage is present, the abnormality determination unit 207a controls the operation of the communication unit 22 or the output unit 25 and notifies a predetermined notification destination of information indicating the abnormal breeding cage to. The abnormal breeding cage is a breeding cage 9 in which the probability estimated by the estimation unit 205a is equal to or greater than a predetermined probability. The predetermined notification destination may be, for example, the output unit 25 itself. The predetermined notification destination may be, for example, a predetermined external device of the communication destination of the communication unit 22.

In this manner, the excrement property estimation system 100 having the feces property estimation device 2a instead of the feces property estimation device 2 notifies of an abnormal breeding cage among the plurality of breeding cages 9. For this reason, a breeding manager can arrive at the abnormal breeding cage at an earlier timing, and a breeding animal in an abnormal state can receive care at an earlier stage. As a result, aggravation of severe disease in the breeding animals is suppressed. As a result, in a breeding place having the plurality of breeding cages 9, a labor required for confirming a breeding cage 9 by the breeding manager can be reduced.

Note that the excrement property estimation system 100 does not necessarily have to estimate whether it is an abnormal feces or a non-abnormal feces. At the time of learning of the feces property estimation model learning device 1, training data annotated in more detail such as no feces, loose feces, muddy feces, or watery feces are used, and thereby a feces property estimation model that classifies the feces state of an input image in more detail and estimates the probability of each classification is obtained. For this reason, by using the feces property estimation model obtained in this manner, the excrement property estimation system 100 can classify the input image in more detail and estimate each probability.

In learning, image data of the extracted image of feces in which a portion of feces is extracted in advance from the captured image may also be used as learning image data. Note that a portion of feces is a portion where a region of the feces on a screen surrounded by a rectangle with the smallest area among rectangles that satisfy a condition that the region of the feces can be enclosed. The extracted image of feces is an image of extracted feces. Extracted feces are feces whose horizontal projection area is equal to or greater than a predetermined area. That is, the learning image data may be the image data of the extracted feces image, which is an image extracted from the previously captured image and whose horizontal projection area is equal to or greater than a predetermined area. In such a case, the feces property estimation model learning device 1 uses image data of an image in which an obstacle is not reflected to perform learning of the feces property estimation learning model. For this reason, a mathematical model with a higher accuracy of distinguishment between feces and obstacles can be obtained as a feces property estimation model. Obstacles are objects other than feces whose color and shape are close to those of feces within a predetermined reference value. When an object of property estimation by the excrement property estimation system 100 is feces, obstacles are things other than feces, but when the object of property estimation by the excrement property estimation system 100 is excrement, obstacles are things other than excrement. In other words, obstacles are things other than the excrement subject to property estimation by the excrement property estimation system 100.

In addition, for learning, the image data of an image obtained by performing image processing with a filter that does not allow the color of obstacles such as feeds to pass through on an image captured in advance may be used as the learning image data. In such a case, the feces property estimation model learning device 1 uses the image data of the image in which the obstacle is not reflected to perform the learning of the feces property estimation learning model. For this reason, the mathematical model with a higher accuracy of distinguishment between feces and obstacles can be obtained as a feces property estimation model.

In addition to the learning image data, the input-side training data may further include information indicating a date and time when the learning image data has been captured (hereinafter referred to as "image-capturing date and time") (hereinafter referred to as "image-capturing date and time information"). In such a case, the learning (or updating) of the feces property estimation learning model is performed on the basis of not only the learning image data but also the image-capturing date and time. In other words, for the learning of the feces property estimation learning model, an estimation of the probability that an abnormal feces is reflected in an image shown by the learning image data is performed on the basis of the learning image data and the image-capturing date and time, and the learning of the feces property estimation learning model is updated on the basis of a result of the estimation.

For this reason, in such a case, the feces property estimation model obtained by the feces property estimation model learning device 1 is a mathematical model that estimates the probability that an abnormal feces is reflected in analysis target image data on the basis of the analysis target image data and the image-capturing date and time when an image of the analysis target image data is captured. Therefore, in such a case, the analysis target data further includes image-capturing date and time information indicating the image-capturing date and time when the image of the analysis target image data has been captured in addition to the analysis target image data.

An effect of including the image-capturing date and time information will be described. Animals may have habits of performing actions according to a date and time such as nocturnal habits. For this reason, the state of feces reflected in the captured image may have a correlation with a date and time. Therefore, by performing the learning of the feces property estimation learning model on the basis of not only the learning image data but also the image-capturing date and time, a mathematical model for estimating the probability of a presence or absence of an abnormal feces using information on animals' habits according to the date and time can be obtained as the feces property estimation model. For this reason, an accuracy of estimation by the feces property estimation device 2 is further improved by performing the learning using the image-capturing date and time information.

Especially, in the case of diurnal (sleep at night) animals such as marmosets, many of them have a characteristic of defecating early in the morning. For animals with the characteristic of defecating early in the morning, it is desirable to capture an image of bedding once in the morning to acquire an image of fresh feces. This is because fresh feces is the easiest to determine the state of feces. In this manner, the image-capturing date and time information is related to the state of feces. Note that many other animals also have a habit in defecation time. For this reason, by acquiring image data at a timing of defecating fresh feces, the estimation accuracy is improved. Conversely, when there has been a large amount of feces at a time out of habit, there is a high probability that the breeding animal is in an abnormal state, and there is a high possibility of having abnormal feces. For this reason, the image-capturing date and time information is related to the state of feces. When the determination is performed for consecutive days, the accuracy of estimation is further improved by using information on the previous day.

In addition, it is not necessary that only one animal be reared in the breeding cage 9. When a plurality of animals are reared in the breeding cage 9, the bedding 903 has feces of a plurality of animals.

For learning, information indicating the maximum number of animals whose excrement is present in a fecal space (hereinafter referred to as "numerical information") may be used. Specifically, the input-side training data may include numerical information.

In addition, loose feces and vomit look similar and are difficult to be distinguished. However, both indicate abnormality of breeding animals. For this reason, the excrement property estimation system 100 may also determine vomit as an abnormal feces.

The amount of feces is roughly proportional to the number of animals being reared in the breeding cage 9. Then, not all the animals reared in the breeding cage 9 have abnormal feces at the same timing. For this reason, as the number of animals reared in the breeding cage 9 increases, a rate of abnormal feces is more likely to be less than that of normal feces, which is normal feces. This means that, as the number of animals reared in the breeding cage 9 increases, it is more difficult to estimate whether there is an abnormal feces. Therefore, by performing learning using numerical information, the feces property estimation model learning device 1 can obtain a mathematical model in which the relationship between the number of animals and abnormal feces is also learned as a feces property estimation model. For this reason, the accuracy of estimation by the feces property estimation device 2 and the feces property estimation device 2a is further improved by performing learning using the numerical information. Note that when numerical information is also used in learning, the numerical information is also included in the analysis target data. The numerical information included in the analysis target data indicates the number of animals to be estimated.

For learning, information indicating a type of feed (hereinafter referred to as "feed information") given to the breeding animal at a predetermined timing prior to an image-capturing time, such as immediately before a time of capturing an image, may also be used. Specifically, the input-side training data may include feed information. Note that the image-capturing time is a time at which image-capturing is performed by the image-capturing device 901 that obtains a captured image.

Since feces are formed when feed is digested, there is a correlation between feed and feces. Therefore, by performing learning using feed information, the feces property estimation model learning device 1 can obtain a mathematical model in which a relationship between feed and an abnormal feces is also learned as a feces property estimation model. For this reason, the accuracy of estimation by the feces property estimation device 2 and the feces property estimation device 2a is further improved by performing learning using the feed information. When feed information is also used for learning, the analysis target data also includes the feed information.

As mentioned above, feed has a correlation with feces. For this reason, the accuracy of estimation is improved by inserting the feed information. Normal feces often have a similar shape regardless of feed. However, in the case of abnormal feces, undigested matter may be included, and an effect of feed is likely to appear on the state of the feces. For this reason, the accuracy of estimation can be improved by using information on the type of feed to be given (color, ingredients, manufacturer, and the like of feed). Furthermore, the feed information may include a state of feed.

In addition, it is difficult to distinguish vomit from feces when it falls on a bedding. However, since vomit is more strongly affected by feed than feces, the accuracy of distinguishment between feces and vomit is improved by using feed information. As a result, the accuracy of vomit estimation by the excrement property estimation system 100 is improved. In addition, as described above, vomit also indicates an abnormality in breeding animals. For this reason, the excrement property estimation system 100 may determine that there is an abnormality in the breeding animals even when the presence of vomit is estimated.

For learning, information on breeding animals (hereinafter referred to as "breeding animal information") may be used. Specifically, input-side training data may include the breeding animal information. The breeding animal information may include information on taxonomic species, genetic lineage, sex, maturity (age in days, weeks, months, or age), and the like of the breeding animal.

The properties of feces change depending on breeding animal characteristics such as species, genetic lineage, sex, and maturity. Therefore, by performing learning using the breeding animal information, the feces property estimation model learning device 1 can obtain a mathematical model in which the relationship between the breeding animal characteristics and abnormal feces is also learned as a feces property estimation model. For this reason, by performing learning using the breeding animal information, the accuracy of estimation by the feces property estimation device 2 and the feces property estimation device 2a is further improved. Note that, when the breeding animal information is also used for learning, feed information is also included in the analysis target data.

Note that the image-capturing device 901 may be a camera that captures images with visible light, or an infrared camera. The captured image output by the image-capturing device 901 may be monochrome or color.

The communication unit 12, the communication unit 22, and the communication unit 22a may be configured to include an interface for connecting to an external storage device such as a universal serial bus (USB) memory that stores various types of information. In such a case, the communication unit 12, the communication unit 22, and the communication unit 22a may output the information to the external storage device to which they are connected.

Note that the feces property estimation model learning device 1 and the feces property estimation device 2 do not necessarily have to be mounted as different devices. The feces property estimation model learning device 1 and the feces property estimation device 2 may be, for example, mounted as one device having both functions.

Note that the feces property estimation model learning device 1 and the feces property estimation device 2a do not necessarily have to be mounted as different devices. The feces property estimation model learning device 1 and the feces property estimation device 2a may also be, for example, mounted as one device having both functions.

The excrement property estimation system 100 may be mounted as a system using a plurality of information processing devices communicably connected via a network. In this case, each functional unit included in the feces property estimation model learning device 1 and the feces property estimation device 2 may be distributed and mounted in a plurality of information processing devices. In addition, each functional unit included in the feces property estimation model learning device 1 and the feces property estimation device 2a may be distributed and mounted in the plurality of information processing devices.

All or some of functions of the feces property estimation model learning device 1, the feces property estimation device 2, and the feces property estimation device 2a may be also mounted by using hardware such as an application specific integrated circuit (ASIC), a programmable logic device (PLD), and a field programmable gate array (FPGA). The program may be recorded on a computer-readable recording medium. A computer-readable recording medium is a portable medium such as a flexible disk, a magneto-optical disk, a ROM, and a CD-ROM, or a storage device such as a hard disk embedded in a computer system. A program may be transmitted via telecommunication lines.

Note that the fecal space is an example of an excrement space. An abnormal feces is an example of abnormal excrement. The feces property estimation learning model is an example of an excrement property estimation learning model. The feces property estimation learning model execution unit 105 is an example of the excrement property estimation learning model execution unit. The feces property estimation model learning device 1 is an example of the excrement property estimation model learning device. The feces property estimation devices 2 and 2a are examples of the excrement property estimation device. The extracted feces image is an example of the extracted excrement image.

Although the embodiment of the present invention has been described in detail with reference to the drawings, a specific configuration is not limited to this embodiment, and includes design within a range not departing from the gist of the present invention.

REFERENCE SIGNS LIST

100 Excrement property estimation system
1 Feces property estimation model learning device
2, 2a Feces property estimation device
11 Control unit 12 Communication unit
13 Input unit
14 Storage unit
15 Output unit
101 Communication control unit
102 Input control unit
103 Output control unit
104 Training data acquisition unit
105 Feces property estimation learning model execution unit
106 Update unit
107 Termination determination unit
108 Recording unit
21, 21a Control unit
22, 22a Communication unit
23 Input unit
24 Storage unit
25 Output unit
201, 201a Communication control unit
202 Input control unit
203 Output control unit
204, 204a Analysis target data acquisition unit
205, 205a Estimation unit
206 Recording unit
207, 207a Abnormality determination unit
91 Processor
92 Memory
93 Processor
94 Memory
95 Processor
96 Memory
900 Breeding animal
901 Image-capturing device
902 Floor mesh
903 Bedding
910 Specialist

What is claimed is:

1. An excrement property estimation model learning device comprising:
    a processor; and
    a storage medium having computer program instructions stored thereon, wherein the computer program instruction, when executed by the processor perform processing of;
    acquiring training data including input-side training data including an excrement space which is a predetermined space where there is excrement from an animal being reared, and learning image data that is image data of a captured image obtained by capturing the excrement space, and a correct label indicating whether any abnormal excrement that is abnormal excrement is reflected in an image shown in the learning image data;
    estimating the probability that abnormal excrement is reflected in the image shown in the learning image data by using an excrement property estimation learning model, which is a machine learning model for estimating a probability that abnormal excrement is reflected in the learning image data; and
    updating, on the basis of a difference between an estimation result from the excrement property estimation learning model execution unit and the correct label, the excrement property estimation learning model such that the difference is reduced.

2. The excrement property estimation model learning device according to claim 1, wherein the learning image data is image data of an extracted excrement image that is an image extracted from a captured image in advance, and is an image of excrement whose horizontal projection area is equal to or greater than a predetermined area.

3. The excrement property estimation model learning device according to claim 1, wherein the learning image data is image data of an image after image processing is previously performed on a captured image by a filter that does not allow color of obstacles that are not excrement and whose color and shape are close to those of excrement within a predetermined reference value to pass through.

4. The excrement property estimation model learning device according to claim 1, wherein the input-side training data includes information indicating a date and time when the learning image data has been captured.

5. The excrement property estimation model learning device according to claim 1, wherein the input-side training data includes information indicating the maximum number of animals whose excrement is present in an excrement space.

6. The excrement property estimation model learning device according to claim 1, wherein the input-side training data includes information indicating a feed given to the animal being reared at a predetermined timing prior to a time when an image is captured by an image-capturing device that obtains a captured image.

7. A non-transitory computer readable medium which stores a program that causes a computer to function as the excrement property estimation model learning device according to claim 1.

8. An excrement property estimation model learning method comprising:
    acquiring training data including input-side training data including an excrement space which is a predetermined space where there is excrement from an animal being reared, and learning image data that is image data of a captured image obtained by capturing the excrement space, and a correct label indicating whether any abnormal excrement that is abnormal excrement is reflected in an image shown in the learning image data;
    estimating the probability that abnormal excrement is reflected in the image shown in the learning image data, by using an excrement property estimation learning model, which is a machine learning model for estimating a probability that abnormal excrement is reflected in the learning image data; and
    updating, on the basis of a difference between a result of the estimation in the excrement property estimation learning model execution step and the correct label, the excrement property estimation learning model such that the difference is reduced.

* * * * *